H. BURIN.
Device for Cutting off and Screw-Threading Metal Rods.
No. 225,048. Patented Mar. 2, 1880.
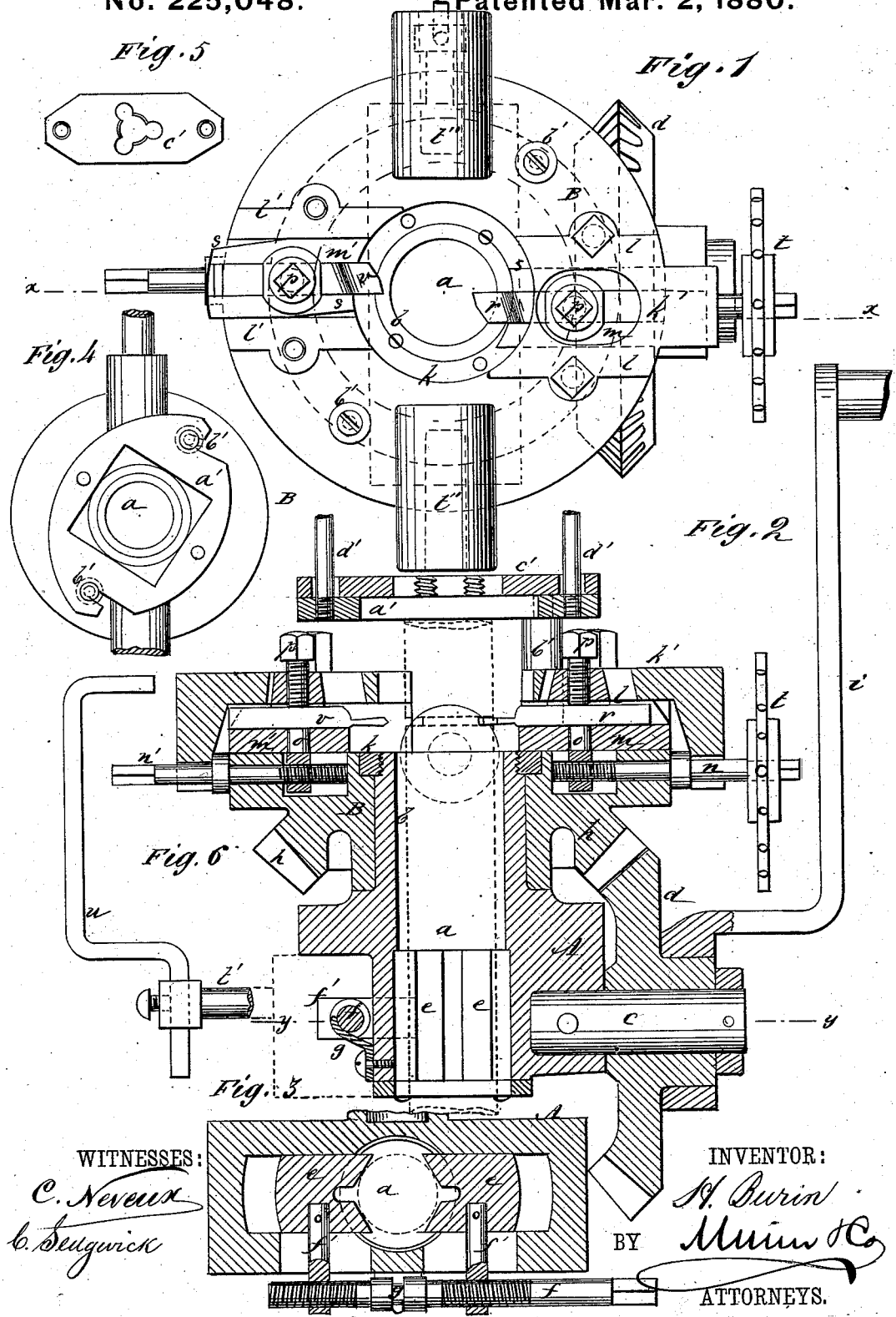

UNITED STATES PATENT OFFICE.

HENRI BURIN, OF NEW YORK, N. Y.

DEVICE FOR CUTTING OFF AND SCREW-THREADING METAL RODS.

SPECIFICATION forming part of Letters Patent No. 225,048, dated March 2, 1880.

Application filed May 20, 1879.

*To all whom it may concern:*

Be it known that I, HENRI BURIN, of the city, county, and State of New York, have invented a new and Improved Rotary Die-Plate and Metal-Cutter, of which the following is a specification.

My invention consists in a tool for cutting off metal rods, bars, or shafts, and also for cutting screw-threads, and is especially intended for heavy work. I make use of a cutter-head fitted for being revolved by a hand-crank and gearing on a base or support that is to be clamped around the bar or shaft. The cutting-tool travels around the shaft or rod, and is set up by a screw as the work progresses.

The head is adapted for receiving screw-cutting dies in place of the cutters, or as separate attachments, and there are other features of construction whereby the work is facilitated, all of which I will describe more particularly in connection with the accompanying drawings, wherein—

Figure 1 is a plan view of the tool fitted with cutters. Fig. 2 is a central vertical section on line $xx$ of Fig. 1, and with the die-plate attached. Fig. 3 is a horizontal section on line $yy$ of Fig. 2. Fig. 4 is a top view of the die-holding plate attached upon the cutter-head. Fig. 5 represents a form of die-plate adapted for light work. Fig. 6 is a side view of the arm for automatically setting up the cutter.

Similar letters of reference indicate corresponding parts.

The base A of the tool is formed with a central aperture, $a$, a tubular extension, $b$, upon the upper side, that receives the rotary head B, with a boss or projection at one side, to which is attached the fixed arbor or stud $c$ for the bevel-gear $d$, and the lower part of base A is recessed to receive the clamping-blocks $e\ e$, that are fitted to slide across the aperture $a$, and by which the head is clamped to the rod or shaft that is to be operated upon. The clamping-blocks $e$ are moved by means of a right-and-left-hand screw, $f$, that engages with the pins $f'$, which project from blocks $e$ through slots in the side of base A, and the screw $f$ is retained against endwise movement by a fixed tongue or lug, $g$, projecting from A into an annular slot in the screw. The lower portion of the head B is formed with or has attached to it a bevel-gear, $h$, that meshes with the gear $d$ on base A, and the hub of $d$ is formed to receive the crank-handle $i$, by which the head B is revolved by the described gearing. Upon the upper end of the tubular projection $b$ is a screw-ring, $k$, that sets into an annular recess in head A and prevents the head from rising on the base.

The upper surface of the head B is formed with raised flanges $l$, between which the cutter-carrying slide $m$ is fitted for radial movement to and from the aperture $a$ by means of the screw-rod $n$, that is fitted in head B, and carries in a radial mortise the nut $o$, which has a pin projecting into the lower side of slide $m$. The slide $m$ is prevented from rising by a cap-plate, $k'$, attached to flanges $l$ by top screws, so that by removing this plate $k'$ the cutter-slide may be removed, and plate $k'$ is slotted for the set-screw $p$ that clamps the cutter $r$. The cutter $r$ sets in a groove of slide $m$, and has its cutting-point shaped to cut a narrow slot in the rod or shaft, as illustrated by dotted lines in Fig. 2.

To prevent injury to the cutter-point in case the head is turned backward, the slide $m$ is beveled at each side, as at $s$, which permits the slide to turn on the nut $o$ at such backward movement, so that the point of the cutter will clear the bottom of the slot.

Upon the outer end of screw-rod $n$ is a hand-wheel, $t$, fitted with radial pins, as shown, for use in withdrawing or setting up the cutter by hand; and to move the cutter inward a regular distance automatically at each rotation of the head the device shown in Fig. 6 is made use of. This consists of a bent arm, $u$, adjustable vertically in its supporting-screw $t'$, that is tapped in the side of base A, and having its upper end projecting so as to come in contact with the pins of wheel $t$ and turn it and screw $n$ at each rotation a greater or less distance, according to the vertical adjustment of the arm $u$.

In cutting off a bar it is only necessary to cut a groove in depth about one-third the diameter of the rod, and then break the rod. To render the fracture less ragged, I provide an additional cutter, $v$, with a fine cutting-point, to cut a line in the bottom of the groove formed by cutter $r$, so that the fracture will follow that line. This cutter $v$ is fitted in a slide, $m'$, between flanges $l'$ upon head B, at the side of aperture $a$ opposite to cutter $r$, and it is fitted and operated in a similar manner, except that its screw-rod $n'$ will be moved by a wrench, and it will be operated after the cutter $r$ has completed its work.

For the purpose of cutting a screw-thread with the above-described tool, the cutters $r$ $v$ may be removed and suitable cutting-dies inserted in place.

In Figs. 2 and 4 I have shown attachments for the same purpose, which do not require the removal of the cutters.

For large screws the plate $a'$ will be attached by screws to the posts $b'$ that rise from head A, and the dies attached in the central aperture of plate $a'$. For cutting smaller screws the cutting-dies are formed as part of a plate, $c'$, as shown in Fig. 5, which plate is to be attached on the studs $d'$ that project from plate $a'$.

The above-described tool is very effective for the purposes named. A bar of large size may be readily cut and with great rapidity, and as a screw-cutter it is equally available for heavy work.

The rotary head B is formed with handle-sockets $t''$, into which handles may be inserted, so that the head can be operated without the use of the crank and gearing.

Having thus described my invention, I claim as new and desire to secure by Letters Patent—

1. In a rotary cutter, the cutter-slide $m'$ and cutter $v$, in combination with the rotary head B and main cutter $r$, substantially as and for the purposes set forth.

2. In a rotary screw-cutter, the die-plate $a'$ or $c'$, in combination with the rotary head B, that is fitted with posts $b'$, substantially as described and shown, and for the purposes specified.

3. In a rotary cutting-tool, the cutter-slides $m$ or $m'$, having beveled sides $s$, the flanges $l$ or $l'$, and the nut $o$ or $o'$, combined together and with the rotary head B, as and for the purposes specified.

4. The screw ring or collar $k$, in combination with the rotary head B and base A, having the tubular extension $b$, as and for the purposes specified.

HENRI BURIN.

Witnesses:
GEO. D. WALKER,
C. SEDGWICK.